(12) United States Patent  
Zhang (10) Patent No.: US 12,127,687 B1  
(45) Date of Patent: Oct. 29, 2024

(54) FOLDABLE CHAIR FRAME AND FOLDABLE CHAIR

(71) Applicant: Ninghai Jiarun Hardware Co., Ltd., Zhejiang (CN)

(72) Inventor: Zhenguo Zhang, Zhejiang (CN)

(73) Assignee: Ninghai Jiarun Hardware Co., Ltd., Ningbo (CN)

( * ) Notice: Subject to any disclaimer, the term of this patent is extended or adjusted under 35 U.S.C. 154(b) by 0 days.

(21) Appl. No.: 18/665,897

(22) Filed: May 16, 2024

(30) Foreign Application Priority Data

Apr. 25, 2024 (CN) .......................... 202420881542.3

(51) Int. Cl.
- A47C 4/28 (2006.01)
- A47C 4/30 (2006.01)
- A47C 4/34 (2006.01)
- A47C 4/36 (2006.01)
- A47C 4/44 (2006.01)
- A47C 4/46 (2006.01)
- A47C 9/10 (2006.01)
- F16M 11/16 (2006.01)
- F16M 11/26 (2006.01)

(52) U.S. Cl.
CPC .................. *A47C 4/30* (2013.01); *A47C 4/28* (2013.01); *A47C 4/286* (2013.01); *A47C 4/34* (2013.01); *A47C 4/36* (2013.01); *A47C 4/44* (2013.01); *A47C 4/46* (2013.01); *A47C 9/105* (2013.01); *F16M 11/16* (2013.01); *F16M 11/26* (2013.01)

(58) Field of Classification Search
CPC .. A47C 4/30; A47C 4/28; A47C 4/286; A47C 4/34; A47C 4/36; A47C 4/44; A47C 4/46; A47C 9/105; F16M 11/16; F16M 11/26
USPC .......................................... 297/16.2; 248/168
See application file for complete search history.

(56) References Cited

U.S. PATENT DOCUMENTS

| | | | | | |
|---|---|---|---|---|---|
| 405,839 | A | * | 6/1889 | Hurlburt ................... | A47C 9/00 248/435 |
| 550,256 | A | * | 11/1895 | Deane ...................... | A47C 9/00 248/435 |
| 564,129 | A | * | 7/1896 | Wade ...................... | A47C 9/105 248/435 |
| 1,565,636 | A | * | 12/1925 | Goetz .................... | A47C 9/105 297/461 |
| 3,709,167 | A | * | 1/1973 | Sprigman ................ | A47C 4/44 248/435 |

(Continued)

FOREIGN PATENT DOCUMENTS

CN 215456693 U * 1/2022 ............. A47C 4/286

*Primary Examiner* — Robert Canfield (57) ABSTRACT

A foldable chair frame and a foldable chair are provided. The foldable chair frame includes a base, having three or more opening grooves; and three or more joint structures, each including a first rotating member and a second rotating member that are coaxially pin-jointed in the opening groove. A stopper that limits a relative rotation angle between the second rotating member and the first rotating member is disposed on the first rotating member. A first abutting part that limits a relative rotation angle between the first rotating member and the base is disposed on the first rotating member; and/or a second abutting part that limits relative rotation angle between the second rotating member and the base is disposed on the second rotating member.

16 Claims, 13 Drawing Sheets

(56) References Cited

U.S. PATENT DOCUMENTS

| | | | |
|---|---|---|---|
| 6,820,845 B2* | 11/2004 | Nakatani | F16M 11/16 248/177.1 |
| 11,832,732 B2* | 12/2023 | Zhu | A47C 4/286 |
| 11,844,439 B1* | 12/2023 | Wang | A47C 3/34 |
| 2013/0026315 A1* | 1/2013 | Lee | F16M 11/16 248/168 |
| 2023/0023969 A1* | 1/2023 | Zhu | A47C 4/286 |
| 2023/0200539 A1* | 6/2023 | Chen | A47C 3/18 297/47 |

\* cited by examiner

FOLDABLE CHAIR FRAME AND FOLDABLE CHAIR

CROSS REFERENCE TO RELATED APPLICATIONS

The present application claims the benefit of Chinese Patent Application No. 202420881542.3 filed on Apr. 25, 2024, the contents of which are incorporated herein by reference in their entirety.

TECHNICAL FIELD

The present application relates to the field of foldable chair frame technologies, and more specifically, to a foldable chair frame and a foldable chair.

BACKGROUND

In design of a foldable chair, for a conventional structure, a connecting member is usually used as a main body and is disposed in the middle of the foldable chair, to insert or hinge four leg tubes and four support tubes. This design is effective in providing basic support and stability, but has some inconveniences in practical use.

Unfolding the foldable chair requires step-by-step installation or opening, and consequently a use process is more complex and time-consuming. A user needs to connect or open all components in sequence. This operation is cumbersome, and may also cause the user to feel inconvenient during use or unwilling to frequently use the foldable chair.

SUMMARY

The present application aims to resolve one of technical problems in a related technology to a specific extent. Therefore, the present application proposes a foldable chair frame. A stopper and a first abutting part and/or a second abutting part are disposed on the foldable chair frame, to implement synchronous rotation of a second rotating member and a first rotating member, thereby improving convenience and reducing use difficulty.

The present application further provides a foldable chair having the foregoing chair frame.

A technical solution used in the present application is providing a foldable chair frame, including:
  a base, having three or more opening grooves; and
  three or more joint structures, each including a first rotating member and a second rotating member that are coaxially pin-jointed in the opening groove.

A stopper that limits a relative rotation angle between the second rotating member and the first rotating member is disposed on the first rotating member.

A first abutting part that limits a relative rotation angle between the first rotating member and the base is disposed on the first rotating member; and/or
  a second abutting part that limits relative rotation angle between the second rotating member and the base is disposed on the second rotating member.

After the foregoing structure is used, the present application has the following advantages:

1. In the present application, the stopper and the first abutting part and/or the second abutting part are disposed, so that in a process of unfolding the foldable chair frame, after the second rotating member is rotated to a specific angle, the stopper stops the second rotating member from continuing rotating relative to the first rotating member. The second rotating member continues to be rotated, and the second rotating member drives, through the stopper, the first rotating member to synchronously rotate. This improves convenience in folding and unfolding the foldable chair frame, and reduces use difficulty.

2. In the present application, the first abutting part and/or the second abutting part are/is disposed, so that when the first rotating member and/or the second rotating member are/is unfolded relative to the base, the first abutting part and/or the second abutting part tightly abut/abuts against the base to receive force. This ensures stability of the foldable chair frame during unfolding, thereby enhancing structure reliability and security of the foldable chair frame. This design can effectively prevent accidental folding or instability in a use process, thereby providing more reliable seat experience for a user.

According to an embodiment of the present application, a limiting wall is disposed on the second rotating member, and a process in which the foldable chair frame is switched from a folded state to an unfolded state includes a first unfolding process and a second unfolding process.

In the first unfolding process, the second rotating member can rotate relative to the first rotating member until the limiting wall abuts against the stopper.

In the second unfolding process, the second rotating member drives the first rotating member to synchronously rotate.

According to an embodiment of the present application, a first limiting part is disposed on a side that is of the first rotating member and that faces the base, and the first limiting part abuts against an inner side wall of the opening groove in the folded state.

According to an embodiment of the present application, a plurality of arc-shaped grooves are disposed on one of the first rotating member and the second rotating member, limiting posts that fit with the arc-shaped grooves through sliding and limiting are disposed on the other of the first rotating member and the second rotating member, and a center of the arc-shaped groove is located on a pivot of the first rotating member. The arc-shaped groove and the limiting post are disposed to limit rotation strokes of the first rotating member and the second rotating member.

According to an embodiment of the present application, a second limiting part is disposed on a side that is of the second rotating member and that faces the first rotating member, and the second limiting part abuts against the first rotating member in the folded state. That is, in the folded state, both the first rotating member and the second rotating member are located on the same side of the base, thereby reducing a storage volume of the foldable chair frame.

According to an embodiment of the present application, the opening groove has a top wall, and the first abutting part and/or the second abutting part abut/abuts against the top wall in the unfolded state.

According to an embodiment of the present application, pin holes connected to a pivot are disposed on two side walls of the opening groove.

According to an embodiment of the present application, an outer circumferential surface of a disk structure of the first rotating member protrudes outward to form the stopper.

According to an embodiment of the present application, one of the first rotating member and the second rotating member is configured as a part of a support leg, the other of the first rotating member and the second rotating member is configured as a part of a support arm, and three or more support arms are equal or not equal in length.

According to an embodiment of the present application, each of the support leg and/or the support arm is a fixed rod, a telescopic rod, a spliced rod, or a foldable rod.

A foldable chair is provided, including a seat cloth and the foldable chair frame according to any one of the foregoing embodiments.

BRIEF DESCRIPTION OF THE DRAWINGS

To describe technical solutions in embodiments of the present application or the prior art more clearly, the following briefly describes the accompanying drawings required for describing the embodiments or the prior art. Clearly, the accompanying drawings in the following description merely show some embodiments of the present application, and a person of ordinary skill in the art may still derive other drawings from these accompanying drawings without creative efforts.

Figure 1:
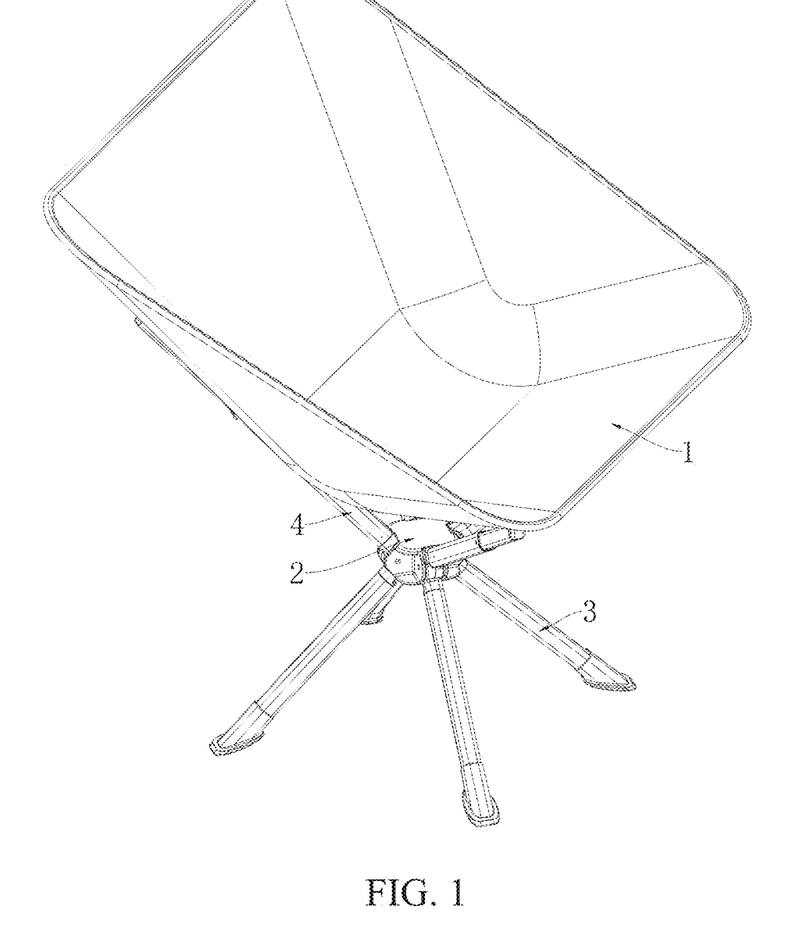
FIG. 1 is a three-dimensional view of a foldable chair according to an embodiment of the present application.

DESCRIPTION OF REFERENCE SIGNS IN THE FIGURES 1. seat cloth; 2. base; 3. support leg; 4. support arm;
21. opening groove; 22. inner side wall; 23. top wall; 24. pin hole;
31. first rotating member; 32. stopper; 33. first pin-jointed hole; 34. first limiting part; 35. first abutting part; and 36. limiting post;
41. second rotating member; 42. limiting wall; 43. second pin-jointed hole; 44. second limiting part; 45. second abutting part; 46. arc-shaped groove.

DETAILED DESCRIPTION

The following describes in detail embodiments of the present application. Examples of the embodiments are shown in the accompanying drawings, in which same or similar reference signs throughout represent same or similar elements or elements having same or similar functions. The following embodiments described with reference to the accompanying drawings are examples and are merely intended to explain the present application, and cannot be understood as limitations on the present application.

Embodiment 1

As shown in FIG. 2 to FIG. 13, a foldable chair frame is disclosed in this embodiment, including:
a base 2, having four opening grooves 21; and
four joint structures, each including a first rotating member 31 and a second rotating member 41 that are coaxially pin-jointed in the opening groove 21.

A stopper 32 that limits a relative rotation angle between the second rotating member 41 and the first rotating member 31 is disposed on the first rotating member 31.

A first abutting part 35 that limits a relative rotation angle between the first rotating member 31 and the base 2 is disposed on the first rotating member 31; and
a second abutting part 45 that limits relative rotation angle between the second rotating member 41 and the base 2 is disposed on the second rotating member 41.

Figure 2:
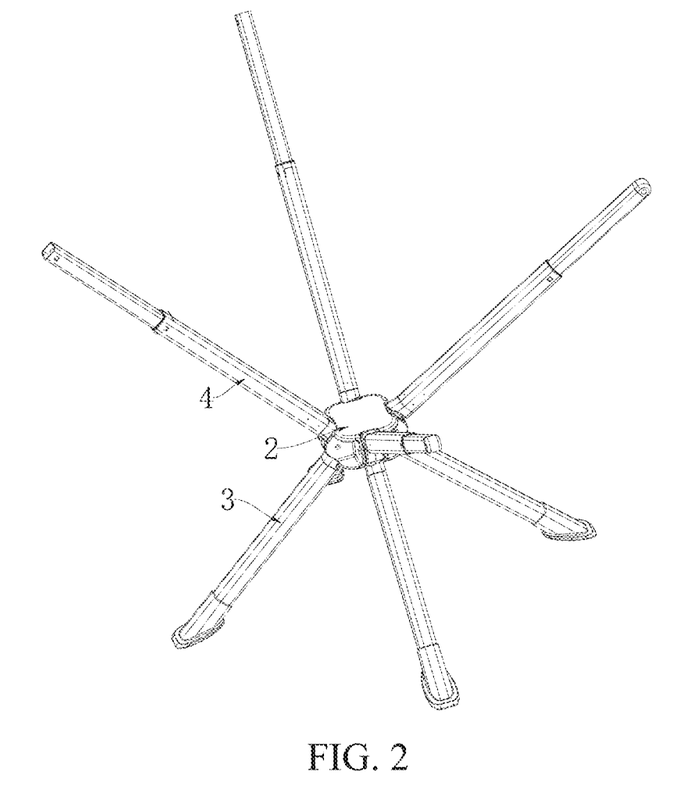
FIG. 2 is a three-dimensional view of a foldable chair frame according to an embodiment of the present application.
Figure 3:
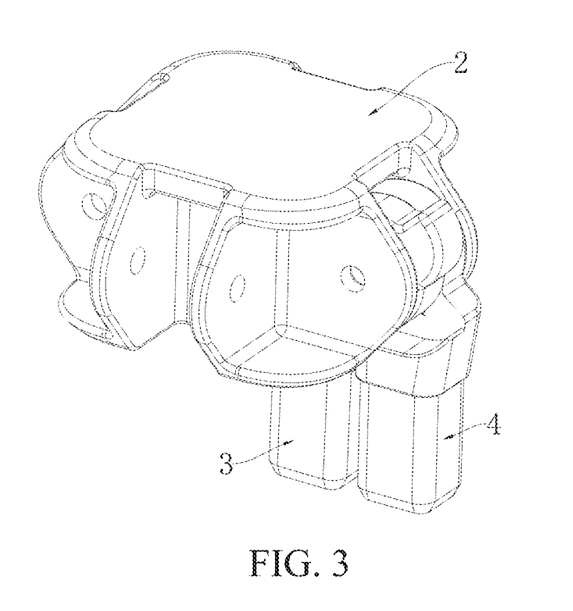
FIG. 3 is a partial structural diagram of a foldable chair frame in a folded state according to an embodiment of the present application.
Figure 4:
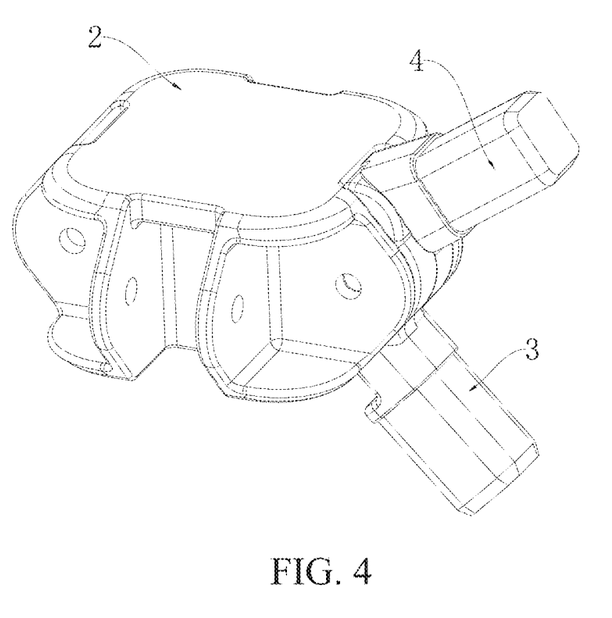
FIG. 4 is a partial structural diagram of a foldable chair frame in an unfolded state according to an embodiment of the present application.

Further, with reference to FIG. 2 and FIG. 3, in this embodiment, the first rotating member 31 is configured as a part of a support leg 3, and the second rotating member 41 is configured as a part of a support arm 4. The first rotating member 31 is connected to a first telescopic rod as a connecting member, and is combined with the first telescopic rod to form the support leg 3. Likewise, the second rotating member 41 is connected to a second telescopic rod as a connecting member, and is combined with the second telescopic rod to form the support arm 4.

Further, in another embodiment, the first rotating member 31 is combined with a fixed rod to form the support leg 3, and the first rotating member 31 is used as a part of a fixed structure of the support leg 3. Likewise, the second rotating member 41 is combined with a fixed rod to form the support arm 4, and the second rotating member 41 is used as a part of a fixed structure of the support arm 4. Furthermore, in another embodiment, the first rotating member 31 is in an end-to-end connection with a plurality of splice rods to form the support leg 3, and the second rotating member 41 is in an end-to-end connection with another plurality of splice rods to form the support arm 4. In still another embodiment, the first rotating member 31 is combined with a foldable rod to form the support leg 3, and the second rotating member 41 is combined with another foldable rod to form the support arm 4. The foldable rod has a plurality of rod bodies, and two adjacent rod bodies are in an end-to-end connection through a hinge structure.

Further, in this embodiment, one end of the support leg 3 is pin-jointed to the base 2, and the other end is a free end and is configured to be in contact with the ground. When four support legs 3 are mutually unfolded, a support structure of the foldable chair frame is formed, so that the base 2 has a specific height above ground level. One end of the support arm 4 is pin-jointed to the base 2, and the other end is configured to be connected to a corner of a seat cloth 1, so that the seat cloth 1 is unfolded to form a contour structure that supports a human buttock.

Further, in this embodiment, two adjacent support arms 4 in four support arms 4 are front seat rods, the remaining two support arms 4 are back seat rods, and the back seat rod is longer than the front seat rod. Four corners of the seat cloth 1 are respectively connected to the four support arms 4. A chair structure is formed. A seat cloth 1 at a front seat rod position forms a contour structure that supports a human buttock, and a seat cloth 1 at a back seat rod position forms a backrest structure that limits a human back.

In another embodiment, four support arms 4 are equal in length, and four corners of the seat cloth 1 are respectively connected to the four support arms 4. A stool structure is formed. The stool structure has only a contour structure that supports a human buttock and has no backrest structure.

With reference to FIG. 10 to FIG. 13, in this embodiment, the base 2 is roughly square, and four sides of the base 2 each have an opening groove 21. The opening groove 21 includes two side walls disposed in parallel, an inner side wall 22 connected to the two side walls, and a top wall 23. Side walls and inner side walls 22 on the entire base 2 together form a #-shaped structure. A pin hole 24 is disposed on each of the two side walls of the opening groove 21. Correspondingly, a first pin-jointed hole 33 is disposed on the first rotating member 31, and a second pin-jointed hole 43 is disposed on the second rotating member 41. A pin passes through the first pin-jointed hole 33 and the second pin-jointed hole 43, to coaxially connect the joint structure in the opening groove 21 in a pin-jointed manner. The pin is a pivot.

Further, the first abutting part 35 and the second abutting part 45 abut against the top wall 23 in an unfolded state.

Figure 8:
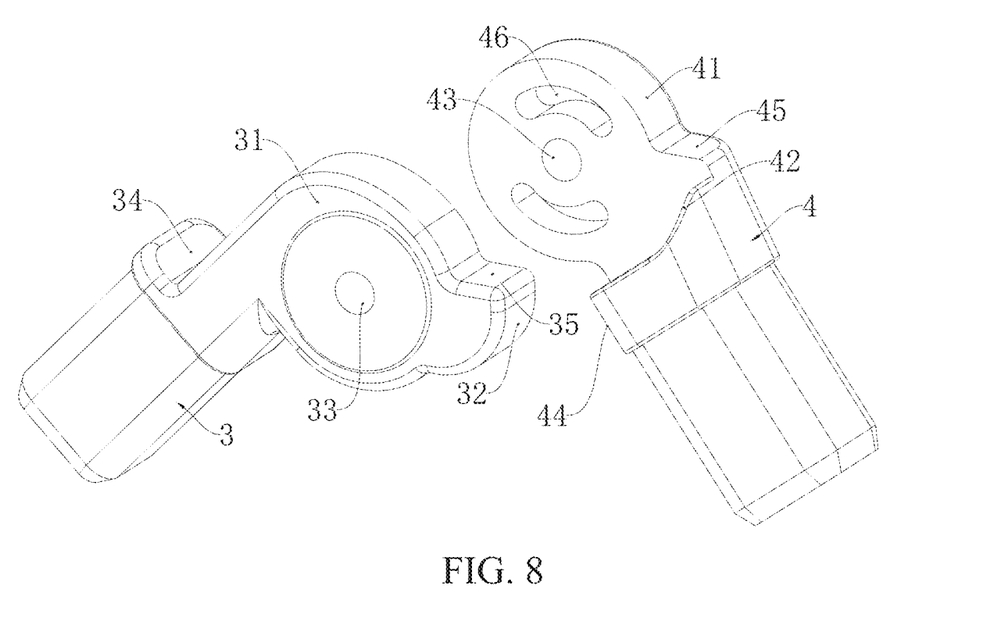
FIG. 8 is an exploded view of a joint structure according to an embodiment of the present application.
Figure 9:
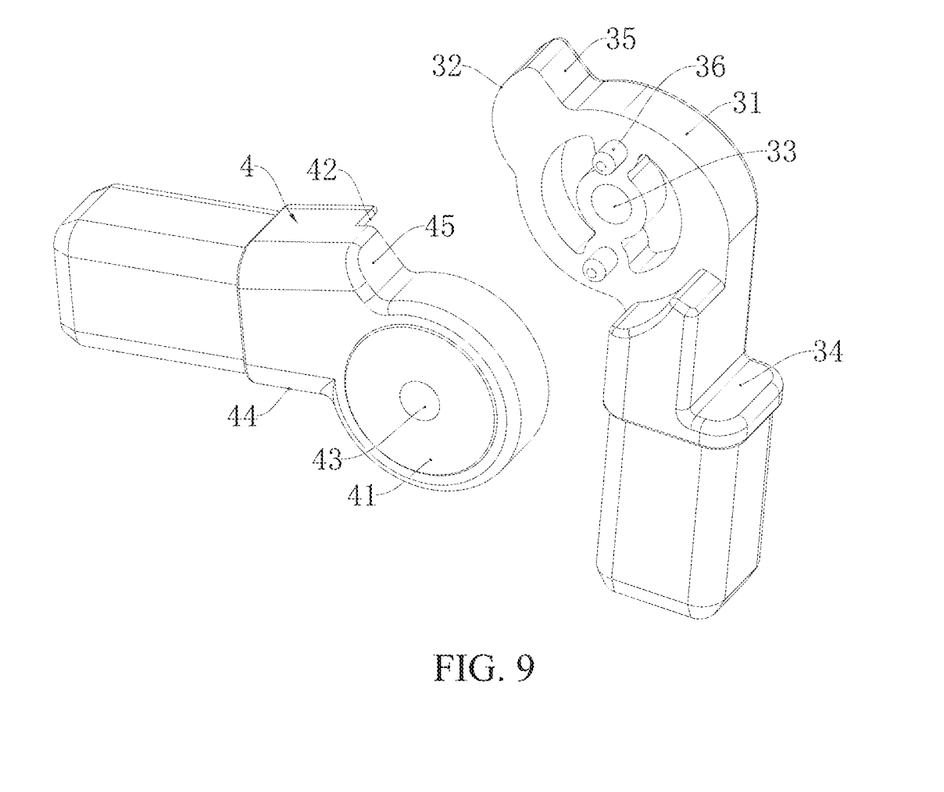
FIG. 9 is a schematic structural diagram of a joint structure according to an embodiment of the present application.
Figure 10:
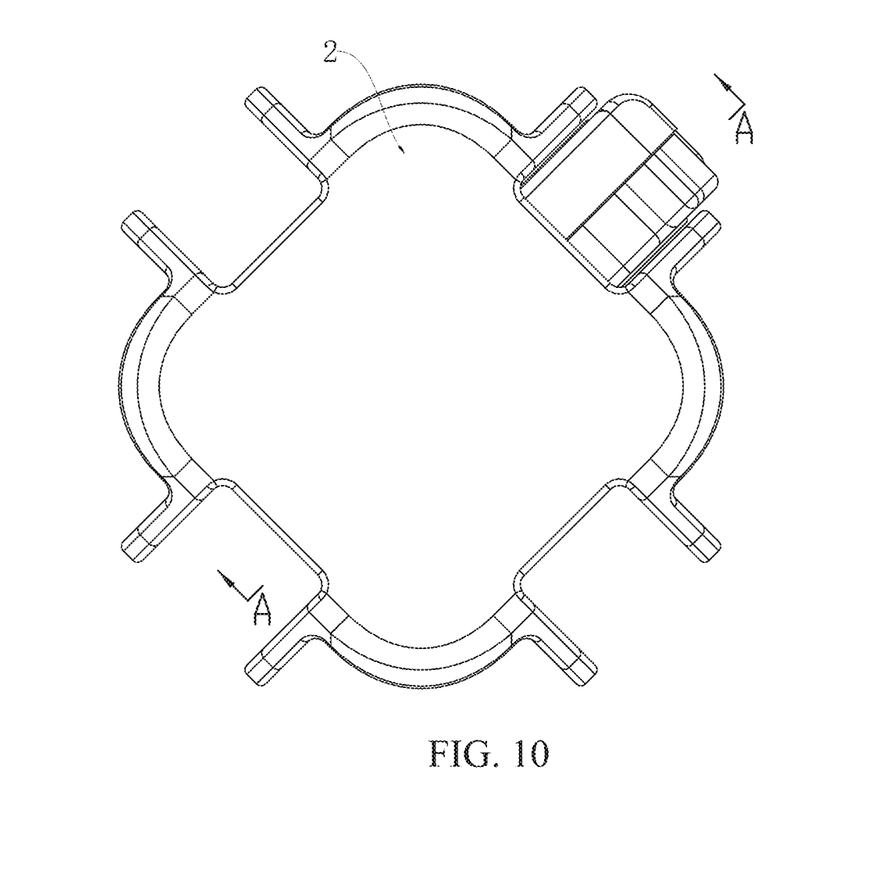
FIG. 10 is a partial top view of a foldable chair frame in a folded state according to an embodiment of the present application.

Specifically, with reference to FIG. 8 and FIG. 9, a limiting wall 42 is disposed on the second rotating member 41, and a process in which the foldable chair frame is switched from a folded state to the unfolded state includes a first unfolding process and a second unfolding process.

Figure 5:
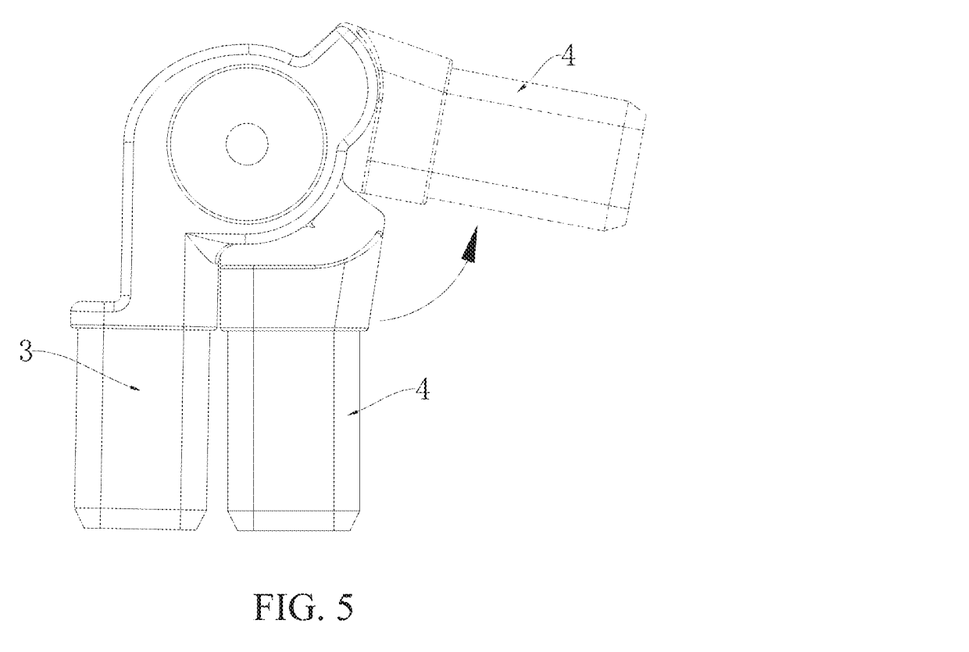
FIG. 5 is a schematic diagram of a foldable chair frame in a first unfolding process according to an embodiment of the present application.
Figure 11:
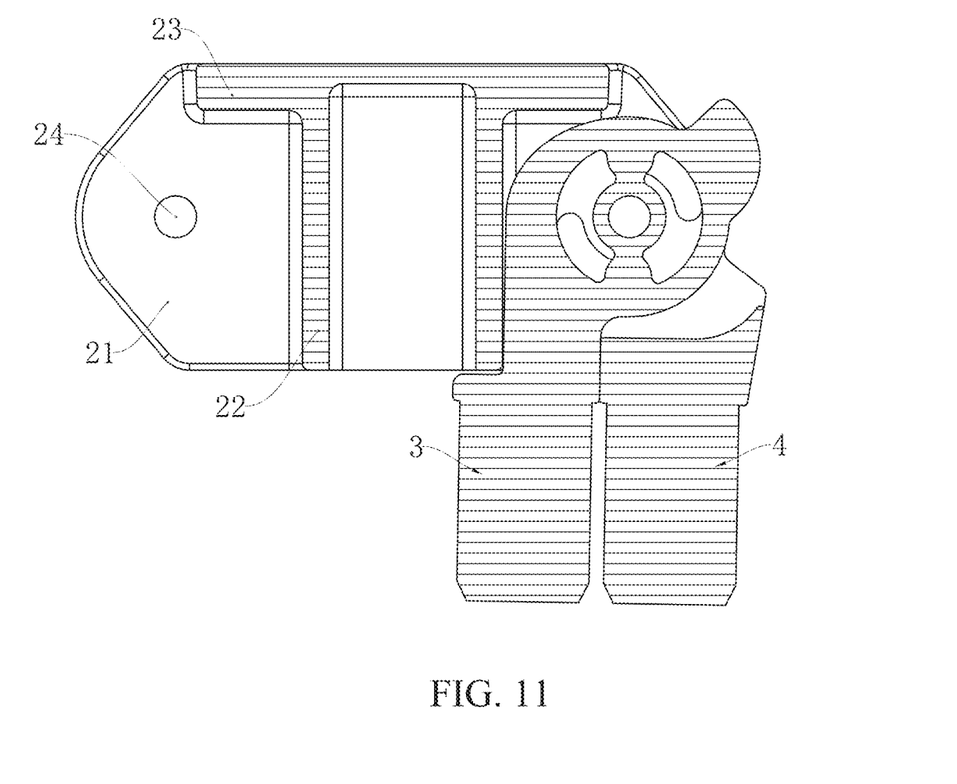
FIG. 11 is a sectional view of a line A-A in FIG. 10.
Figure 12:
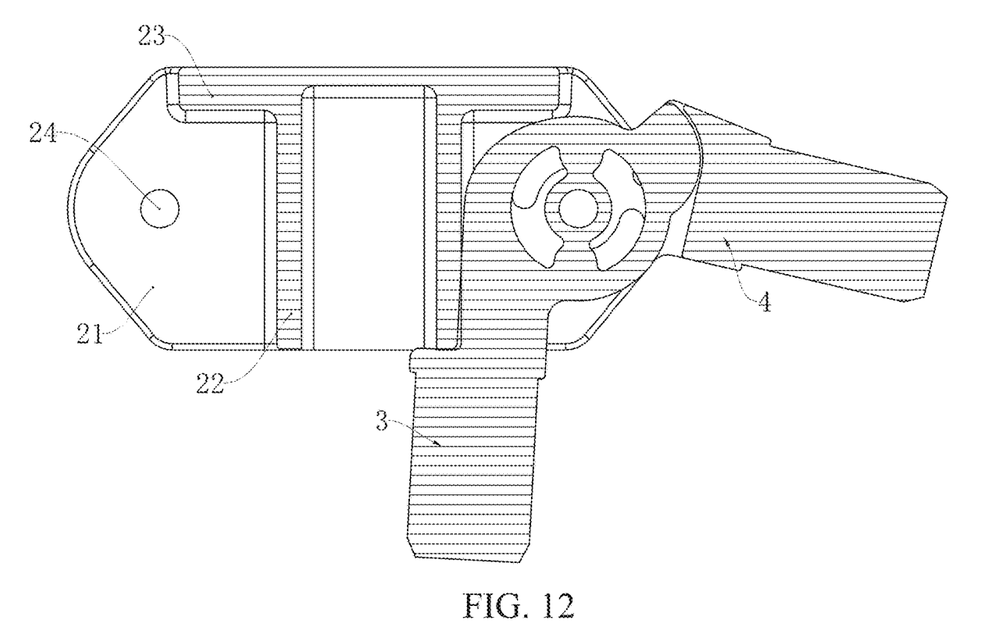
FIG. 12 is a sectional view of a foldable chair frame in a first unfolding process according to an embodiment of the present application.

With reference to FIG. 5, FIG. 11, and FIG. 12, in the first unfolding process, the second rotating member 41 can rotate relative to the first rotating member 31 until the limiting wall 42 abuts against the stopper 32.

Figure 6:
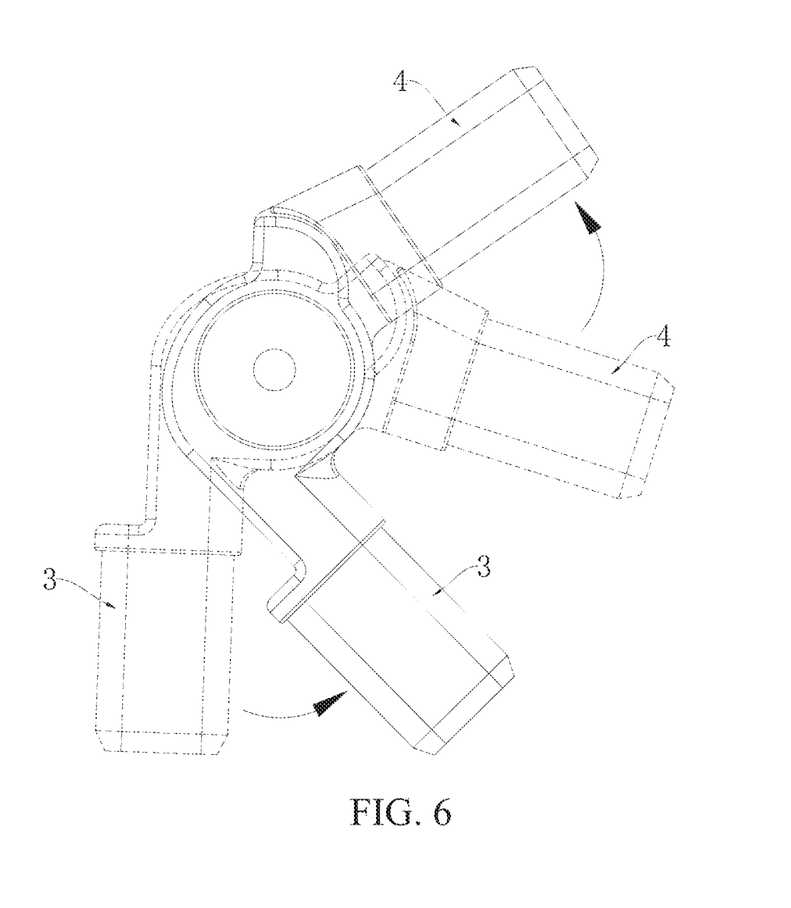
FIG. 6 is a schematic diagram of a foldable chair frame in a second unfolding process according to an embodiment of the present application.
Figure 7:
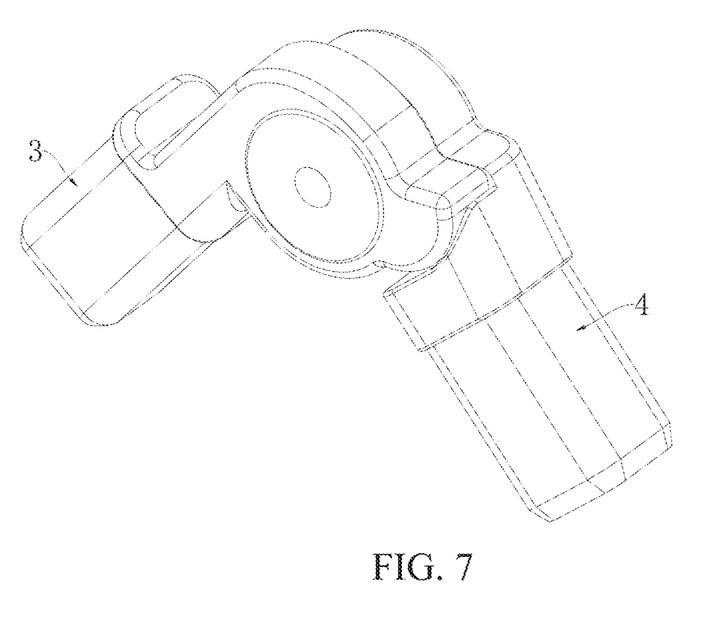
FIG. 7 is a three-dimensional view of a joint structure according to an embodiment of the present application.
Figure 13:
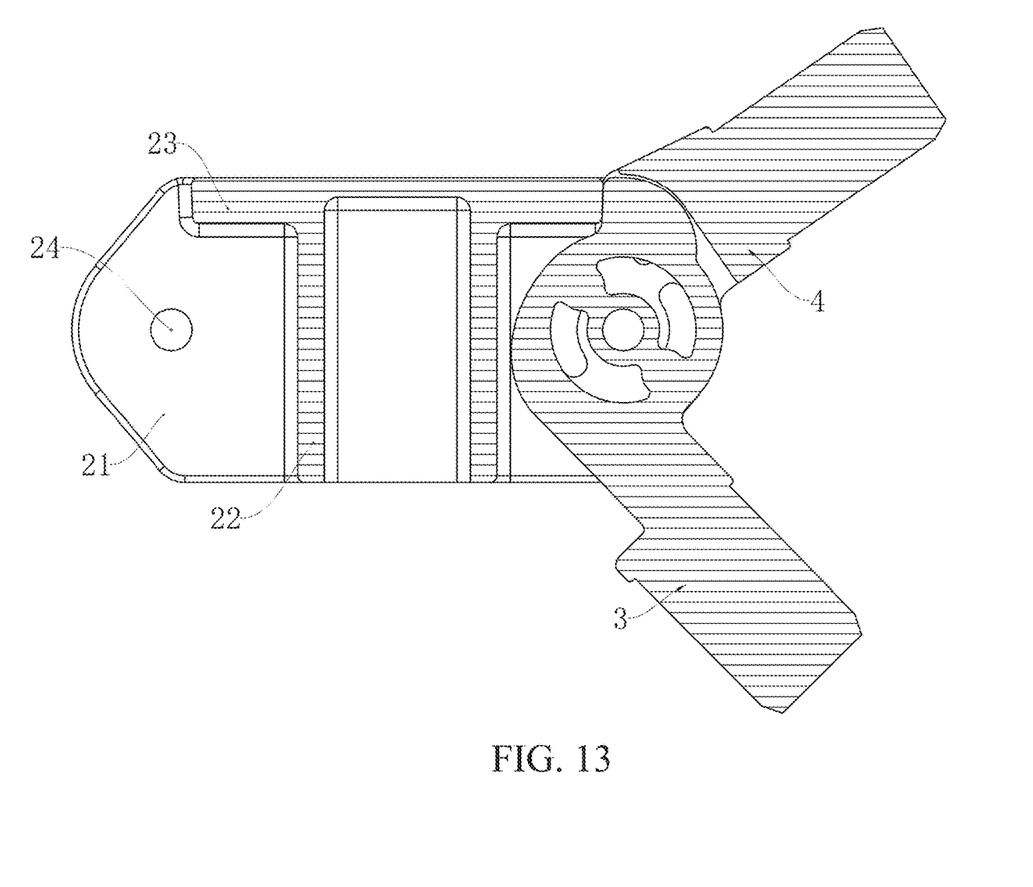
FIG. 13 is a sectional view of a foldable chair frame in a second unfolding process according to an embodiment of the present application.

With reference to FIG. 6 and FIG. 13, in the second unfolding process, the second rotating member 41 drives, through abutting of the limiting wall 42 against the stopper 32, the first rotating member 31 to synchronously rotate.

Further, in this embodiment, one end of the first rotating member 31 and one end of the second rotating member 41 have disk structures whose outside diameters are approximately equal. The two disk structures are combined to form a cylindrical structure. An axial width of the cylindrical structure is equivalent to a width of the first rotating member 31 and a width of the second rotating member 41. An outer circumferential surface of a disk structure of the first rotating member 31 protrudes outward to form the stopper 32, and the limiting wall 42 is disposed on the second rotating member 41. When the first rotating member 31 and the second rotating member 41 are combined to form the joint structure, the limiting wall 42 is located outside the stopper 32.

Specifically, a first limiting part 34 is disposed on a side that is of the first rotating member 31 and that faces the base 2, and the first limiting part 34 abuts against the inner side wall 22 of the opening groove 21 in the folded state. Two arc-shaped grooves 46 are disposed on the second rotating member 41, and the two arc-shaped grooves 46 are centrally symmetrical about a pivot of the first rotating member 31. Two limiting posts 36 are disposed on the first rotating member 31. The limiting posts 36 respectively fit with the arc-shaped grooves 46 corresponding to the limiting posts 36 through sliding and limiting, and a center of the arc-shaped groove 46 is located on the pivot of the first rotating member 31. The arc-shaped groove 46 and the limiting post 36 are disposed to limit rotation strokes of the first rotating member 31 and the second rotating member 41.

Further, in another embodiment, two arc-shaped grooves 46 are disposed on a side that is of the disk structure of the first rotating member 31 and that faces the second rotating member 41, and the two arc-shaped grooves 46 are centrally symmetrical about a pivot of the second rotating member 41. Two limiting posts 36 are disposed on a side that is of a disk structure of the second rotating member 41 and that faces the first rotating member 31. The limiting posts 36 respectively fit with the arc-shaped grooves 46 corresponding to the limiting posts 36 through sliding and limiting, and a center of the arc-shaped groove 46 is located on the pivot of the second rotating member 41.

Specifically, a second limiting part 44 is disposed on a side that is of the second rotating member 41 and that faces the first rotating member 31, and the second limiting part 44 abuts against the first rotating member 31 in the folded state. That is, in the folded state, both the first rotating member 31 and the second rotating member 41 are located on the same side of the base 2, thereby reducing a storage volume of the foldable chair frame.

With reference to FIG. 1, a foldable chair is disclosed in another embodiment, including a seat cloth 1 and the foldable chair frame according to any one of the foregoing embodiments.

In the description of the present application, it should be understood that a direction or position relationship indicated by the term such as "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", or "circumferential" is a direction or position relationship shown based on the accompanying drawings. The direction or position relationship is merely intended to facilitate the description of the present application and simplify the description and is not intended to indicate or imply that an indicated apparatus or element must have a specific direction or must be constructed and operated in a specific direction, and therefore cannot be understood as a limitation on the present application.

In addition, the term such as "first" or "second" is merely used for description purposes, and cannot be understood as an indication or implication of relative importance or an implication of a quantity of indicated technical features. Therefore, a feature limited by "first" or "second" may explicitly or implicitly include at least one feature. In the description of the present application, "a plurality of" means at least two, for example, two or three, unless otherwise clearly and specifically limited.

In the present application, the term such as "installation", "interconnection", "connection", or "fastening" shall be understood in a broad sense unless otherwise clearly specified and limited. For example, the term may be a fixed connection, a detachable connection, or integration; may be a mechanical connection, an electrical connection, or mutual communication; may be a direct connection, or an indirect connection performed through an intermediate medium; or may be an internal connection between two elements, or an interaction relationship between two elements, unless otherwise clearly limited. A person of ordinary skill in the art may understand a specific meaning of the foregoing term in the present application based on a specific case.

In the present application, unless otherwise clearly specified and limited, that a first feature is "on" or "under" a second feature may be that the first feature is in direct contact with the second feature, or that the first feature is in indirect contact with the second feature through an intermediate medium. Moreover, that a first feature is "on", "above", or "over" a second feature may be that the first feature is directly above or diagonally above the second feature, or merely indicates that the first feature is at a higher level than the second feature. That a first feature is "under", "below", or "beneath" a second feature may be that the first feature is directly below or diagonally below the second feature, or merely indicates that the first feature is at a lower level than the second feature.

In the description of this specification, a description provided with reference to the term such as "an embodiment", "some embodiments", "an example", "a specific example", or "some examples" means that specific characteristics, structures, materials, or features described in combination with this embodiment or example are included in at least one embodiment or example of the present application. In this specification, the schematic expressions of the foregoing terms are not necessarily directed to the same embodiment or example. Moreover, the described specific characteristics, structures, materials, or features may be combined in an appropriate manner in any one or more embodiments or examples. In addition, without a mutual contradiction, a person skilled in the art may combine different embodiments or examples described in this specification and combine features of different embodiments or examples.

Although the embodiments of the present application have been shown and described above, it may be understood that the foregoing embodiments are examples and cannot be understood as limitations on the present application, and a person of ordinary skill in the art may make changes, modifications, substitutions, or variations on the foregoing embodiments within the scope of the present application.

What is claimed is:

1. A foldable chair frame, comprising:
   a base, having three or more opening grooves; and
   three or more joint structures, each comprising a first rotating member and a second rotating member that are coaxially pin-jointed in a corresponding opening groove, wherein
   a stopper that limits a relative rotation angle between the second rotating member and the first rotating member is disposed on the first rotating member; and
   a first abutting part that limits a relative rotation angle between the first rotating member and the base is disposed on the first rotating member; and/or
   a second abutting part that limits relative rotation angle between the second rotating member and the base is disposed on the second rotating member;
   wherein a plurality of arc-shaped grooves are disposed on one of the first rotating member and the second rotating member, limiting posts that fit with the arc-shaped grooves through sliding and limiting are disposed on the other of the first rotating member and the second rotating member, and a center of the arc-shaped groove is located on a pivot of the first rotating member.

2. The foldable chair frame according to claim 1, wherein a limiting wall is disposed on the second rotating member, and a process in which the foldable chair frame is switched from a folded state to an unfolded state comprises a first unfolding process and a second unfolding process;

in the first unfolding process, the second rotating member is able to rotate relative to the first rotating member until the limiting wall abuts against the stopper; and
in the second unfolding process, the second rotating member drives the first rotating member to synchronously rotate.

3. A foldable chair, comprising a seat cloth and the foldable chair frame according to claim 2.

4. The foldable chair frame according to claim 1, wherein a first limiting part is disposed on a side that is of the first rotating member and that faces the base, and the first limiting part abuts against an inner side wall of the opening groove in a folded state.

5. A foldable chair, comprising a seat cloth and the foldable chair frame according to claim 4.

6. The foldable chair frame according to claim 1, wherein a second limiting part is disposed on a side that is of the second rotating member and that faces the first rotating member, and the second limiting part abuts against the first rotating member in a folded state.

7. A foldable chair, comprising a seat cloth and the foldable chair frame according to claim 6.

8. The foldable chair frame according to claim 1, wherein an outer circumferential surface of a disk structure of the first rotating member protrudes outward to form the stopper.

9. A foldable chair, comprising a seat cloth and the foldable chair frame according to claim 8.

10. The foldable chair frame according to claim 1, wherein one of the first rotating member and the second rotating member is configured as a part of a support leg, the other of the first rotating member and the second rotating member is configured as a part of a support arm, and three or more support arms are equal or not equal in length.

11. The foldable chair frame according to claim 10, wherein each of the support leg and/or the support arm is a fixed rod, a telescopic rod, a spliced rod, or a foldable rod.

12. A foldable chair, comprising a seat cloth and the foldable chair frame according to claim 11.

13. A foldable chair, comprising a seat cloth and the foldable chair frame according to claim 10.

14. A foldable chair, comprising a seat cloth and the foldable chair frame according to claim 1.

15. A foldable chair frame, comprising:
    a base, having three or more opening grooves; and
    three or more joint structures, each comprising a first rotating member and a second rotating member that are coaxially pin-jointed in a corresponding opening groove, wherein
    a stopper that limits a relative rotation angle between the second rotating member and the first rotating member is disposed on the first rotating member; and
    a first abutting part that limits a relative rotation angle between the first rotating member and the base is disposed on the first rotating member; and/or
    a second abutting part that limits relative rotation angle between the second rotating member and the base is disposed on the second rotating member, wherein the corresponding opening groove has a top wall, and the first abutting part and/or the second abutting part abut/abuts against the top wall in an unfolded state.

16. A foldable chair, comprising a seat cloth and the foldable chair frame according to claim 15.

* * * * *